UNITED STATES PATENT OFFICE.

JULES BEBIE, OF ST. LOUIS, MISSOURI, ASSIGNOR TO MONSANTO CHEMICAL WORKS, OF ST. LOUIS, MISSOURI, A CORPORATION OF MISSOURI.

PROCESS FOR PRODUCING SACCHARIN.

1,366,349.  Specification of Letters Patent.  Patented Jan. 25, 1921.

No Drawing.  Application filed September 7, 1920. Serial No. 408,499.

*To all whom it may concern:*

Be it known that I, JULES BEBIE, a citizen of the United States, residing at St. Louis, Missouri, have invented a certain new and useful Improvement in Processes for Producing Saccharin, of which the following is a full, clear, and exact description, such as will enable others skilled in the art to which it appertains to make and use the same.

This invention relates to the manufacture of saccharin—benzosulfinid, my present application being a continuation in part of my pending application Serial No. 359,809, filed February 19, 1920.

It is well known that saccharin is commonly produced by the oxidation of ortho toluene sulfamid in an alkaline solution by means of potassium permanganate. Potassium permanganate is a costly reagent and at the present time is not readily available in large quantities. The object of my invention is to provide a process for the manufacture of saccharin which will be free from the objectionable feature of the process employed at present in the manufacture of saccharin, namely, the necessity of using potassium permanganate as the oxidizing agent.

My invention consists in producing saccharin by oxidizing ortho toluene sulfamid by means of an oxidizing mixture containing chromic acid and sulfuric acid. The said oxidizing mixture can be produced by dissolving chromic acid in sulfuric acid or by mixing a chromate or a dichromate with sulfuric acid, it being preferable to use sulfuric acid of a concentration of at least 50% by weight and a temperature of reaction not higher than 75° C. Preferably, the oxidation of the ortho toluene sulfamid is effected with a mixture of sodium dichromate and sulfuric acid in accordance with the following equation:

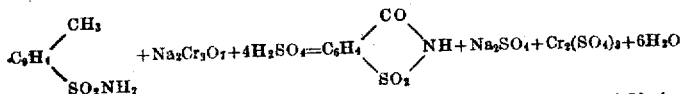

Heretofore it was believed to be impossible to obtain saccharin by oxidation of ortho toluene sulfamid in an acid medium. Previous investigators oxidized the para and meta toluene sulfonamid by means of dichromate sulfuric acid mixture to para and meta sulfamid benzoic acid, but failed to get results with ortho toluene sulfamid, and accordingly, concluded that oxidation with the dichromate sulfuric acid oxidizing mixture was limited to para and meta substitution products. Remsen (*Liebig's Annalen,* vol. 178, page 298) and Noyes (*American Chemical Journal* 8, 176–185).

I have discovered that under suitable conditions ortho toluene sulfamid can be oxidized in an acid medium and that with suitable concentration and temperature of the dichromate sulfuric acid mixture good yields of saccharin can be obtained.

I have found that the concentration of the sulfuric acid used in this process is of the greatest importance. Too high a concentration causes considerable decomposition, and too low a concentration prevents the reaction altogether. In the experiments described in the publications above referred to the relatively low concentration caused the failure to obtain saccharin, because in said experiments the oxidizing mixture had a sulfuric acid concentration of only about 33% by volume. Moreover, even if some saccharin had been obtained with this low concentration, it would have been destroyed again on account of the high temperature of oxidation which was brought about by heating on the steam bath and even boiling of the dichromate acid mixture.

In order to get a consistency of the oxidizing mass which allows thorough stirring, it is necessary to use an excess of sulfuric acid over the amount theoretically required. Instead of using an excess of sulfuric acid neutral diluents may be used; organic solvents like glacial acetic acid or tetrachlorcarbon being particularly suitable for this purpose.

To illustrate the practical operation of my process I shall describe in detail the preferred procedure:

One kg. of ortho toluene sulfamid is fed under stirring into a mixture of 1.7 kg. sodium dichromate and 5 kg. sulfuric acid (50%) at ordinary temperature. On adding now slowly 2.7 kg. concentrated sulfuric acid (98%) the temperature is gradually raised and oxidation to saccharin takes place. The temperature is controlled by stirring and cooling of the mixture and also by the flow of the concentrated sulfuric acid. After addition of all of the acid the temperature may be allowed to rise further in order to complete the reaction but care should be taken not to go above 70° C. Finally the maximum temperature is maintained for a couple of hours. After cooling down again to room temperature the crude saccharin containing some unoxidized amid is filtered from the chrome sulfate solution and washed with water. The separation of the saccharin and some ortho toluene sulfamid which may be present is carried out in the usual manner, by dissolving the saccharin with a sodium carbonate solution, filtering the amid and precipitating the saccharin from the filtrate with a mineral acid.

In order to prevent any hydrolyzing or destructive action of the excess sulfuric acid, a neutral solvent may be used in place of an excess of sulfuric acid to keep the mass sufficiently fluid, as described in the following procedure:

According to this modification, I may dissolve 1 kg. of ortho toluene sulfamid in 2.7 kg. of concentrated sulfuric acid and add this solution to a stirred solution of 1.7 kg. of sodium dichromate in 5.2 kg. glacial acetic acid. The addition of the ortho toluene sulfamid solution is regulated in such a way as to keep the reaction temperature around 55° C., the cooling is accomplished by means of a cooling water jacket, and after the addition of all the dichromate the temperature of 55° C. is maintained for several hours. While the oxidation is proceeding chromic sulfate and saccharin are precipitating from the solution and at the end of the oxidation these products are separated by filtration. The acetic acid is recovered by distillation of the filtrate. The chrome sulfate is dissolved from the saccharin with water and separated by filtration. The crude saccharin still contains some unoxidized ortho toluene sulfamid from which it can be separated in the usual manner by dissolving the saccharin with a sodium carbonate solution, filtering the amid and precipitating the saccharin from the filtrate by acidification with a mineral acid.

While I have described two ways of practising my process, I wish it to be understood that the temperatures and concentrations employed and the quantities of material used may be varied to a considerable extent without departing from the spirit of my invention.

Having thus described my invention, what I claim as new and desire to secure by Letters Patent, is:

1. A process for producing saccharin, characterized by oxidizing ortho toluene sulfamid by means of an oxidizing mixture containing chromic acid, dissolved in sulfuric acid of a concentration of at least 50% by weight and a temperature of reaction not higher than 75° C.

2. A process for producing saccharin, characterized by oxidizing ortho toluene sulfamid by means of an oxidizing mixture consisting of a chromate dissolved in sulfuric acid of a concentration of at least 50% by weight and a temperature of reaction not higher than 75° C.

3. A process for producing saccharin, characterized by oxidizing ortho toluene sulfamid by means of an oxidizing mixture consisting of a dichromate dissolved in sulfuric acid of a concentration of at least 50% by weight and a temperature of reaction not higher than 75° C.

4. A process for producing saccharin, characterized by oxidizing ortho toluene sulfamid by means of an oxidizing mixture consisting of sodium dichromate and sulfuric acid of a concentration of at least 50% by weight and a temperature of reaction not higher than 75° C.

5. A process for producing saccharin, characterized by oxidizing ortho toluene sulfamid by means of an oxidizing mixture consisting of sodium dichromate dissolved in sulfuric acid of a concentration of at least 50% by weight and a temperature of reaction not higher than 75° C. and using in addition to it a neutral solvent as a diluent.

JULES BEBIE.